(12) United States Patent
Higashikawa et al.

(10) Patent No.: US 10,518,510 B2
(45) Date of Patent: Dec. 31, 2019

(54) DECORATIVE SHEET AND METHOD OF MANUFACTURING THE SAME

(71) Applicant: TOPPAN PRINTING CO., LTD., Tokyo (JP)

(72) Inventors: Eiichi Higashikawa, Tokyo (JP); Masamitsu Nagahama, Tokyo (JP); Akira Sato, Tokyo (JP); Masatoshi Takahashi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 21 days.

(21) Appl. No.: 15/906,505

(22) Filed: Feb. 27, 2018

(65) Prior Publication Data

US 2018/0186135 A1 Jul. 5, 2018

Related U.S. Application Data

(63) Continuation of application No. PCT/JP2016/075396, filed on Aug. 31, 2016.

(30) Foreign Application Priority Data

Aug. 31, 2015 (JP) ................... 2015-171229

(51) Int. Cl.
*B32B 27/32* (2006.01)
*C08K 5/00* (2006.01)
(Continued)

(52) U.S. Cl.
CPC .............. *B32B 27/32* (2013.01); *B32B 27/08* (2013.01); *C08J 5/18* (2013.01); *C08K 5/0083* (2013.01);
(Continued)

(58) Field of Classification Search
CPC .............................. B32B 27/32; C08K 5/0083
See application file for complete search history.

(56) References Cited

U.S. PATENT DOCUMENTS

2018/0186132 A1* 7/2018 Ikeda ..................... B32B 27/18

FOREIGN PATENT DOCUMENTS

EP          3 219 488 A1    9/2017
JP          02-128843 A     5/1990
(Continued)

OTHER PUBLICATIONS

Computer-generated English-language translation of JP2010069710A to Niina et al.*
(Continued)

*Primary Examiner* — Vu A Nguyen
(74) *Attorney, Agent, or Firm* — Foley & Lardner LLP

(57) ABSTRACT

The present invention provides a decorative sheet comprising a transparent resin layer having good scratch resistance, good post-processing resistance, and high transparency, and a method of manufacturing the same. The decorative sheet according to one aspect of the present invention comprises at least a transparent resin layer formed by adding to a transparent olefin-based resin nucleating agent vesicles which are vesicles having a single layer outer membrane and containing a nucleating agent, and the Martens hardness of the transparent resin layer is 40 N/mm$^2$ or higher.

9 Claims, 1 Drawing Sheet

(51) Int. Cl.
*B32B 27/08* (2006.01)
*C08J 5/18* (2006.01)

(52) U.S. Cl.
CPC ... *B32B 2307/414* (2013.01); *B32B 2307/536* (2013.01); *B32B 2307/584* (2013.01); *B32B 2451/00* (2013.01); *C08J 2323/12* (2013.01)

(56) References Cited

FOREIGN PATENT DOCUMENTS

| | | | |
|---|---|---|---|
| JP | 04-083664 | A | 3/1992 |
| JP | 06-001881 | A | 1/1994 |
| JP | 06-198831 | A | 7/1994 |
| JP | 09-328562 | A | 12/1997 |
| JP | 10-157042 | A | 6/1998 |
| JP | 10-161273 | A | 6/1998 |
| JP | 2001-270054 | A | 10/2001 |
| JP | 2005-212386 | A | 8/2005 |
| JP | 3772634 | B | 5/2006 |
| JP | 2006-213768 | A | 8/2006 |
| JP | 2010-162748 | A | 7/2010 |
| JP | 2013-122020 | A | 6/2013 |
| WO | WO-2014/007260 | A1 | 1/2014 |

OTHER PUBLICATIONS

Computer-generated English-language translation of JP2013122020A to Abe et al.*
Grellmann and Langer's "Deformation and Fracture Behaviour of Polymer Materials," Springer Series in Materials Science 247, 2017, p. 220.*
Extended European Search Report dated Jan. 4, 2019 in corresponding application No. 16841873.9.
International Search Report issued in International Patent Application No. PCT/JP2016/075396 dated Oct. 11, 2016.
CN Office Action issued in the corresponding Chinese Patent Application Ser. No. 201680049938.X, dated Jun. 5, 2019.
Japanese Office Action issued on patent application No. 2015171229, dated Jul. 9, 2019 (4 pages).

* cited by examiner

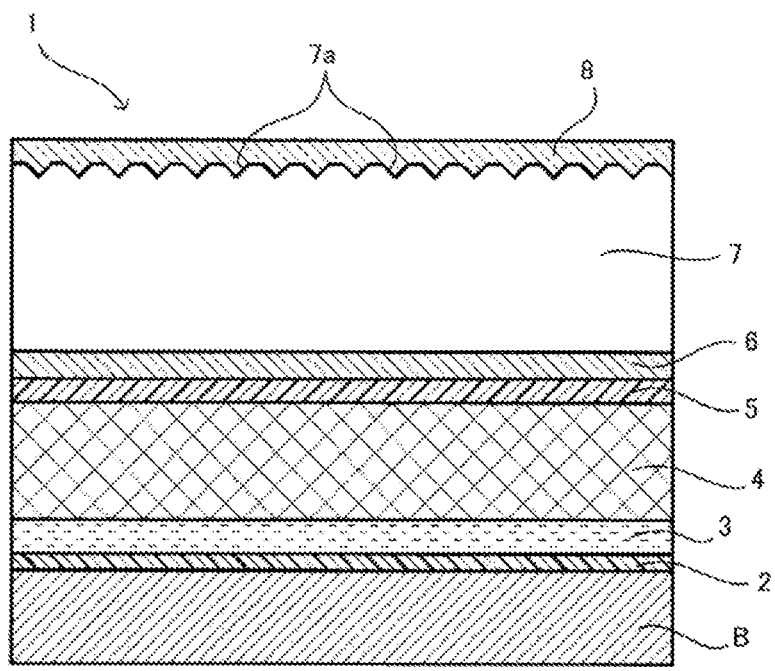

DECORATIVE SHEET AND METHOD OF MANUFACTURING THE SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/075396, filed Aug. 31, 2016, which claims priority to Japanese Patent Application No. 2015-171229, filed Aug. 31, 2015, the entirety of which are hereby incorporated by reference.

TECHNICAL FIELD

The present invention relates to a decorative sheet and a method of manufacturing the same.

BACKGROUND ART

PTLs 1 to 6 disclose example techniques related to a decorative sheet in which an olefin based resin is used, which is drawing attention as an alternative decorative sheet to polyvinyl chloride decorative sheets.

However, many of these decorative sheets comprise a transparent resin layer that lacks good scratch resistance, good post-processing resistance, and high transparency.

CITATION LIST

[Patent Literature] [PTL 1] JP 1990-128843 A; [PTL 2] JP 1992-083664 A; [PTL 3] JP 1994-001881 A; [PTL 4] JP 1994-198831 A; [PTL 5] JP 1997-328562 A; [PTL 6] JP 3772634 B

SUMMARY OF THE INVENTION

The present invention has been made in view of the above points. An object of the present invention is to provide a decorative sheet comprising a transparent resin layer having good scratch resistance, good post-processing resistance, and high transparency, and a method of manufacturing the same.

The inventors of the present invention conducted extensive research in order to solve the above-mentioned problems, and succeeded in making the average particle diameter of spherulites in the crystal part of the transparent olefin resin extremely small by adding, to a transparent olefin-based resin which is a main component of a transparent resin layer, nucleating agent vesicles which are vesicles prepared by the supercritical reverse phase evaporation method and having a single layer outer membrane containing a nucleating agent. Further, the inventors found that high transparency and good mechanical properties are exhibited by setting the Martens hardness of the transparent resin layer to 40 N/mm² or higher, and devised the present invention.

To achieve the above object, the decorative sheet according to one aspect of the present invention comprises at least a transparent resin layer formed by adding to a transparent olefin-based resin nucleating agent vesicles which are vesicles having a single layer outer membrane and containing a nucleating agent, and the Martens hardness of the transparent resin layer is 40 N/mm² or higher.

According to one aspect, the present invention provides a decorative sheet comprising a transparent resin layer having good scratch resistance, good post-processing resistance, and high transparency, and a method of manufacturing the same.

BRIEF DESCRIPTION OF THE DRAWINGS

FIG. 1 is a cross-sectional view of a decorative sheet and a decorative board, showing the configurations thereof, according to an embodiment of the present invention.

DETAILED DESCRIPTION OF A REPRESENTATIVE EMBODIMENT

An embodiment of the present invention will be described with reference to the drawing. It will be understood that the embodiment and variations thereof described below is representative of the present invention and that the present invention is not necessarily limited to the embodiment and variations thereof.

The drawing is schematic, and the relationship of the thickness and the planar dimensions, the ratios of the thicknesses of the layers, and the like are different from the actual ones. In addition, in order to simplify the drawing, well-known structures are schematically shown. The embodiment described below is merely an example showing a configuration for embodying the technical concept of the present invention, and the technical concept of the present invention does not limit the materials, shapes, structures, etc. of the constituent parts to those described below. Further, the technical concept of the present invention can be variously modified within the technical scope described in the claims.

The decorative sheet of the present embodiment comprises at least a transparent resin layer made of a transparent resin sheet formed by adding to a transparent olefin based resin nucleating agent vesicles which are vesicles having a monolayer outer membrane and containing a nucleating agent. It is important that the Martens hardness of the transparent resin layer is 40 N/mm² or higher.

The Martens hardness is a type of indicator showing the hardness of a substance. It is defined as the quotient of the indentation force, calculated from the load applied to an indenter to press it into the surface of the sample, divided by the surface area of the indentation, calculated from the indentation depth obtained by measuring the depth (indentation depth) of the indentation formed at that time. The measuring method is defined more specifically in ISO14577.

In principle, the higher the value of the Martens hardness, the better is the scratch resistance. The Martens hardness of a transparent resin sheet comprising a transparent olefin-based resin can be increased by improving the degree of crystallinity of the transparent olefin-based resin. The degree of crystallinity of the transparent olefin-based resin can be improved by controlling the cooling process at the time of film formation. More specifically, adjustments are made in the cooling process at the time of film formation of the transparent resin sheet, such as increasing the molten resin temperature, increasing the discharge amount of the molten resin, increasing the cooling roll temperature, and decreasing the feeding speed of the transparent resin sheet. Such adjustments extend the time from the crystallization temperature of the transparent olefin-based resin to the hardening completion temperature to promote the degree of crystallinity, and as a result, the Martens hardness becomes 40 N/mm² or higher.

Examples of the transparent olefin-based resin include, besides polypropylene, polyethylene, polybutene, and the like, a homopolymer or a copolymer of one or more of α-olefins (e.g., propylene, 1-butene, 1-pentene, 1-hexene, 1-heptene, 1-octene, 1-nonene, 1-decene, 1-undecene, 1-dodecene, tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene, etc.), and a copolymer of ethylene or an α-olefin with another monomer, for example, an ethylene-vinyl acetate copolymer, ethylene-vinyl alcohol copolymer, ethylene-methyl methacrylate copolymer, ethylene-ethyl methacrylate copolymer, ethylene-butyl methacrylate copolymer, ethylene-methyl acrylate copolymer, ethylene-ethyl acrylate copolymer, ethylene-butyl acrylate copolymer, and the like.

In the present embodiment, it is preferable to use polypropylene that has good transparency. More preferably, using a highly crystalline homopolypropylene resin that is a propylene homopolymer having an isotactic pentad fraction (mmmm fraction) of 95% or higher, it is possible to obtain a transparent resin sheet having good scratch resistance and post-processing resistance. The crystallization temperature of the polypropylene resin is generally within the range of 100° C. to 130° C., and 100° C. to 140° C. when a nucleating agent is added. With regard to the transparent resin sheet used for the decorative sheet of this embodiment, the time taken from the crystallization temperature falling within this range to the hardening completion temperature is extended by controlling the cooling process as described above, so that the Martens hardness will be 40 N/mm$^2$ or higher.

The isotactic pentad fraction (mmmm fraction) is calculated from a value (electromagnetic wave absorption ratio) obtained by making the resin material resonate at a certain resonance frequency using the $^{13}$C-NMR measurement method (nuclear magnetic resonance measurement method) using carbon C (nuclide) having a mass number of 13, and defines the atomic arrangement, the electronic structure, and the molecular microstructure in the resin material. The pentad fraction of the crystalline polypropylene resin is the ratio of five propylene units in a row determined by $^{13}$C-NMR, and it is used as a measure of crystallinity or stereoregularity. The pentad fraction is one of the important factors that mainly determine the scratch resistance of the surface. In principle, the higher the pentad fraction, the higher the degree of crystallinity of the sheet, and the better the scratch resistance.

The nucleating agent vesicle has a structure in which a nucleating agent is encapsulated in a capsule-like vesicle having a monolayer outer membrane, and can be prepared using the supercritical reverse phase evaporation method. The nucleating agent is not limited as long as it is a starting material of crystallization in the crystalline polypropylene resin, and examples include phosphoric acid ester metal salts, benzoic acid metal salts, pimelic acid metal salts, rosin metal salts, benzylidene sorbitol, quinacridone, cyanine blue, and talc. In particular, in the present embodiment, phosphoric acid ester metal salts, benzoic acid metal salts, pimelic acid metal salts, rosin metal salts, etc., which are expected to have transparency, can be considered.

The supercritical reverse phase evaporation method will be described. The supercritical reverse phase evaporation method is a method of preparing nano-sized vesicles (capsules) containing a target substance using carbon dioxide under a supercritical state, or under a temperature or pressure condition that is equal to or exceeds the critical point. Carbon dioxide in a supercritical state indicates carbon oxide that is in a supercritical state with a temperature that is equal to or higher than the critical temperature (30.98° C.) and a pressure that is equal to or higher than the critical pressure (7.3773±0.0030 MPa). Carbon dioxide under a temperature condition that is equal to or exceeds the critical point or a pressure condition that is equal to or exceeds the critical point indicates carbon dioxide under conditions where only one of the critical temperature and the critical pressure exceeds the critical condition.

Specifically, an aqueous phase is injected into a mixture fluid of carbon dioxide in a supercritical state, a substance forming the outer membrane, and a nucleating agent as the encapsulated substance, and an emulsion of carbon dioxide in a supercritical state and the aqueous phase is formed by stirring. Then, once the pressure is reduced, the carbon dioxide expands and evaporates to cause phase transition, and nano-vesicles are formed in which the substance forming the outer membrane in the form of a monolayer membrane covers the surface of the nucleating agent nanoparticle. According to this supercritical reverse phase evaporation method, a vesicle with a single layer membrane can be formed, and therefore an extremely small vesicle can be obtained.

The average particle diameter of the nucleating agent vesicles is preferably half or less of the visible light wavelength (400 nm to 750 nm), more specifically, is 200 nm to 375 nm or less. In the resin composition, the nucleating agent vesicle is present in a state where the outer membrane of the vesicle is ruptured and the nano-sized nucleating agent is exposed. Setting the particle diameter of the nucleating agent to the extremely small size within the above range, the distances between nucleating agent particles are small. Therefore, an edge part of a crystal growing on the basis of one nucleating agent particle immediately comes into contact with an edge part of a crystal which has grown from the surface of another nucleating agent particle adjacent to the nucleating agent particle, and the edge parts of the crystals inhibit growth to stop the growth of both crystals. This makes it possible to significantly reduce the average particle size of spherulites in the crystal parts of the crystalline polypropylene resin, and to provide a transparent resin sheet having high transparency by reducing light scattering.

In such a transparent resin layer in the decorative sheet of the present embodiment, it is preferable that 50% by weight or more and 100% by weight or less of the transparent olefin-based resin as the main component is composed of a highly crystalline homopolypropylene resin, and 0.01 part by weight or more and 0.3 parts by weight or less (preferably, 0.05 parts by weight or more and 0.2 parts by weight or less) of nucleating agent vesicles are added per 100 parts by weight of the transparent olefin-based resin. When the content of the highly crystalline homopolypropylene resin is less than 50% by weight, the proportion of the crystal part of the transparent olefin-based resin also decreases, making it difficult to achieve a Martens hardness of 40 N/mm$^2$ or higher.

(Embodiment)
(Overall Configuration)

Specific examples of the configurations of the decorative sheet 1 and a decorative board of this embodiment will be described with reference to FIG. 1.

As shown in FIG. 1, the decorative sheet 1 of the present embodiment includes a primer layer 2, a concealing layer 3, a primary film layer 4, a pattern printing layer 5, an adhesive layer 6, a transparent resin layer 7, and a top coat layer 8 laminated in this order from the side of a substrate B to which the decorative sheet 1 is attached. Examples of the substrate B include a wooden board, inorganic board, and a metal plate. A decorative board is formed by bonding the decorative sheet 1 to the substrate B.

A detailed explanation of each resin layer will be given below.

(Primer Layer 2)

The primer layer 2 may be an appropriate one of nitrocellulose, cellulose, vinyl chloride-vinyl acetate copolymer, polyvinyl butyral, polyurethane, acrylic, and polyester, and denatured materials, serving as a binder. These may be in any form, such as aqueous, solvent, emulsion-type, or the like. The curing method can also be appropriately selected and used from a one-part type that is curable by itself, a two-part type that requires a curing agent in addition to the main agent, a type that is cured by irradiation with ultraviolet rays or electron beams, and the like. A general curing method is a two-part type which performs curing by combining a urethane-based main agent with an isocyanate-based curing agent. This method is preferable in workability, cost, and cohesive power of the resin itself. In addition to the above-mentioned binder, for example, a coloring agent such as a pigment or dye, an extender pigment, solvent, and any of various additives may be added. In particular, regarding the primer layer 2, since it is located on the backmost side of the decorative sheet 1, considering that the decorative sheet 1 is rolled up as a continuous plastic film (web), it is necessary to prevent blocking caused by films tightly adhering to each other and becoming difficult to slip or not peeling off, and to enhance adhesion with the adhesive. To this end, inorganic filler such as silica, alumina, magnesia, titanium oxide, barium sulfate or the like may be added to the primer layer 2. Since the aim is to secure the adhesion with the substrate B, the total thickness is preferably within the range of 0.1 μm or greater and 20 μm or less.

(Concealing Layer 3)

The concealing layer 3 may be made of the same material as the primer layer 2. As the pigment, for example, it is preferable to use an opaque pigment, titanium oxide, iron oxide or the like in order to impart opacity. Further, for example, the opacity may be improved by adding a metal such as gold, silver, copper, or aluminum. Typically, aluminum flakes are used.

(Primary Film Layer 4)

The primary film layer 4 may be selected from, for example, paper such as thin paper, titanium paper, and resin impregnated paper, synthetic resin such as polyethylene, polypropylene, polybutylene, polystyrene, polycarbonate, polyester, polyamide, ethylene-vinyl acetate polymer, polyvinyl alcohol, and acrylic, foams of these synthetic resins, a rubber such as ethylene-propylene polymer rubber, ethylene-propylene-diene copolymer rubber, styrene-butadiene copolymer rubber, styrene-isoprene-styrene block copolymer rubber, and polyurethane, an organic or inorganic non-woven fabric, synthetic paper, and foil of metal such as aluminum, iron, gold, and silver. When a primary film resin sheet 4 mainly comprised of a polyolefin-based resin is used as the primary film layer 4, due to its surface inertness, for example, both sides of the primary film resin sheet 4 are preferably subjected to corona treatment, plasma treatment, ozone treatment, electron beam treatment, ultraviolet ray treatment, dichromic acid treatment, or the like so as to activate the surfaces. Further, the primer layer 2 may also be provided between the primary film resin sheet 4 and the pattern printing layer 5 in order to ensure sufficient adhesion. In addition, when it is desired to impart opacity to the decorative sheet 1, the concealing layer 3 may be provided, or an opaque pigment or the like may be added to the primary film resin sheet 4 itself, so as to impart opacity.

(Pattern Printing Layer 5)

The pattern printing layer 5 may be made of the same material as the primer layer 2. Examples of highly versatile pigments include condensed azo pigment, insoluble azo pigment, quinacridone, isoindoline, anthraquinone, imidazolone, cobalt, phthalocyanine, carbon, titanium oxide, iron oxide, pearl pigments of mica, and the like. For example, gravure printing, offset printing, screen printing, flexographic printing, electrostatic printing, ink jet printing, or the like can be applied to the primary film layer 4 using the above-mentioned materials to form the pattern printing layer 5. Apart from the method of forming the pattern printing layer 5 by applying ink comprising a mixture of the above binder and pigment, it is also possible to provide the pattern by vapor deposition or sputtering of various metals.

(Adhesive Layer 6)

The adhesive layer 6, for example, can be selected from acrylic, polyester, and polyurethane based ones. Typically, a two-part curing type material which comprises a urethane type polyol as the main agent and isocyanate as the curing agent is used for its workability, cost, and high cohesive force.

(Transparent Resin Layer 7)

The transparent resin layer 7 may be a transparent resin sheet 7 made of a resin composition formed by adding nucleating agent vesicles and various functional additives to a highly crystalline homopolypropylene resin having an isotactic pentad fraction of 95% or higher. The transparent resin sheet 7 has a Martens hardness of 40 N/mm$^2$ or higher. Examples of the various functional additives include a thermal stabilizer, ultraviolet absorber, light stabilizer, anti-blocking agent, catalyst scavenger, colorant, light scattering agent, and gloss control agent. On the surface of the transparent resin layer 7, as shown in FIG. 1, an embossed pattern 7a having a plurality of recesses is formed.

(Top Coat Layer 8)

The top coat layer 8 is not limited as long as it is a resin material that serves to protect the surface and adjust gloss. For example, it may be appropriately selected from resin materials based on polyurethane, acrylic, acrylic silicon, fluorine, epoxy, vinyl, polyester, melamine, aminoalkyd, urea, and the like. The form of the material is also not limited, and it may be, for example, an aqueous, emulsion, or solvent type. The curing method can be appropriately selected and used from a one-part type that is curable by itself, a two-part type that requires a curing agent in addition to the main agent, a type that is cured by irradiation with ultraviolet rays or electron beams, and the like. In particular, one that is cured by mixing a urethane-based main agent with an isocyanate-based curing agent is preferable in view of workability, cost, the cohesive power of the resin itself, and the like.

Further, the decorative sheet 1 of the present embodiment is an example of the aspects of implementation, and for example, the concealing layer 3 and/or the primary film layer 4 may be removed. The primer layer 2 and the adhesive layer 6 can be omitted if there is no problem in the adhesiveness between the two resin layers facing them.

Regarding the decorative sheet 1 of the present embodiment, considering workability, cost, etc., it is preferable that the primer layer 2 is 0.1 to 20 μm thick, the concealing layer 3 is 2 μm to 20 μm thick, the primary film layer 4 is 30 μm to 250 μm thick, the pattern printing layer 5 is 3 μm to 20 μm thick, the adhesive layer 6 is 1 μm to 20 μm thick, the transparent resin layer 7 is 20 μm to 200 μm thick, the top coat layer 8 is 3 μm to 20 μm thick, and the total thickness of the decorative sheet 1 is preferably in the range of 59 μm to 550 μm.

(Effects of the Present Embodiment)

(1) The decorative sheet 1 of the present embodiment comprises at least a transparent resin layer 7 formed by adding, to a transparent olefin based resin, nucleating agent vesicles which are vesicles having a monolayer outer membrane and containing a nucleating agent. The transparent resin layer 7 has a Martens hardness of 40 N/mm² or higher.

Such a configuration provides a decorative sheet 1 comprising a transparent resin layer 7 having good scratch resistance, good post-processing resistance, and high transparency.

(2) In the decorative sheet 1 of the present embodiment, 50% by weight or more and 100% by weight or less of the transparent olefin-based resin may be composed of a highly crystalline homopolypropylene resin.

Such a configuration provides a decorative sheet 1 comprising a transparent resin layer 7 having an even better scratch resistance and higher transparency.

(3) In the decorative sheet 1 of the present embodiment, the highly crystalline homopolypropylene resin may have an isotactic pentad fraction (mmmm fraction) of 95% or higher.

Such a configuration provides a decorative sheet 1 comprising a transparent resin layer 7 can have a particularly good scratch resistance.

(4) The method of manufacturing the decorative sheet 1 of the present embodiment is a method of manufacturing a decorative sheet which comprises at least a transparent resin layer 7 formed by adding, to a transparent olefin based resin, nucleating agent vesicles which are vesicles having a monolayer outer membrane and containing a nucleating agent, wherein the Martens hardness of the transparent resin layer 7 is 40 N/mm² or higher, and the nucleating agent is encapsulated in the vesicle using a supercritical reverse phase evaporation method.

Such a configuration provides a method of manufacturing a decorative sheet 1 comprising a transparent resin layer 7 having good scratch resistance, good post-processing resistance, and high transparency.

EXAMPLES

Specific examples of the decorative sheet 1 of the present invention will be described below.

<Method of Preparing Nucleating Agent Vesicles>

The method of preparing nucleating agent vesicles used in the Examples will now be described. Nucleating agent vesicles were formed using the supercritical reverse phase evaporation method described above. First, 100 parts by weight of methanol, 70 parts by weight of phosphate ester metal salt nucleating agent (ADK STAB NA-21, manufactured by ADEKA) as a nucleating agent, and 5 parts by weight of phosphatidylcholine as a phospholipid constituting the outer membrane of the vesicle were put into a high-pressure stainless steel container kept at 60° C., and after sealing the container, carbon dioxide was injected into the container so that pressure becomes 20 MPa and a supercritical state is reached. Then, the content of the container was vigorously stirred and 100 parts by weight of ion exchanged water was added. Maintaining the temperature and pressure at a supercritical state, mixing by stirring was continued further for 15 minutes. After that, the carbon dioxide was discharged from the container to return it to atmospheric pressure, thereby forming nucleating agent vesicles containing a nucleating agent in the vesicle having a single layer outer membrane made of phospholipid.

Example 1

In Example 1, a decorative sheet 1 comprising a transparent resin layer 7 having a Martens hardness of 60 N/mm² was prepared by adding the above nucleating agent vesicles to a highly crystalline homopolypropylene resin. The decorative sheet 1 of the present example comprises a primary film resin sheet 4 as the primary film layer 4, and was formed by bonding the primary film resin sheet 4 and the transparent resin sheet 7 together by dry lamination.

Specifically, 500 PPM of a hindered amine based antioxidant (IRGANOX 1010, manufactured by BASF), 2000 PPM of a benzotriazole based ultraviolet absorbing agent (TINUVIN 328, manufactured by BASF), 2000 PPM of a hindered amine based light stabilizer (CHIMASSORB 944, manufactured by BASF), and 1000 PPM of the aforementioned nucleating agent vesicles were added to a transparent olefin based resin made of 100% by weight of a highly crystalline homopolypropylene resin with a pentad fraction of 97.8%, a melt flow rate (MFR) of 15 g/10 min (230° C.), and a molecular weight distribution MWD (Mw/Mn) of 2.3. Then, the mixture was extruded using a melt extruder to form a transparent resin sheet 7 having a thickness of 80 μm. Next, corona treatment was applied to both surfaces of the transparent resin sheet 7 so that the wetting tension of the surfaces becomes 40 dyn/cm or higher. At this time, the Martens hardness of the transparent resin sheet 7 was 60 N/mm². Then, on one side of the primary film resin sheet 4 having opacity and a thickness of 70 μm, a pattern printing layer 5 was formed by printing a pattern using a two-part curing type urethane ink (V180, manufactured by Toyo Ink), and on the other side of the primary film resin sheet 4, a primer layer 2 was formed. Further, the transparent resin sheet 7 was attached to the upper surface of the pattern printing layer 5 provided on one side of the primary film resin sheet 4 via an adhesive layer 6 formed of a dry lamination adhesive (TAKELAC A540, manufactured by Mitsui Chemicals, applied amount 2 g/m²) by dry lamination. Next, an embossed pattern 7a was formed on the surface of the transparent resin sheet 7 using a mold roll for embossing, and then a two-part curing type urethane top coat (W184, manufactured by DIC Graphics, applied amount 3 g/m²) was applied so as to cover the embossed pattern 7a, thereby forming the top coat layer 8. Thus, the decorative sheet 1 having a total thickness of 154 μm according to Example 1 was obtained.

Example 2

In Example 2, a decorative sheet 1 comprising a transparent resin layer 7 having a Martens hardness of 60 N/mm² was prepared by adding the above nucleating agent vesicles to a highly crystalline homopolypropylene resin. The decorative sheet 1 of the present example comprises a primary film resin sheet 4 as the primary film layer 4, and was formed by bonding the primary film resin sheet 4 and the transparent resin sheet 7 together by extrusion lamination.

Specifically, 500 PPM of a hindered amine based antioxidant (IRGANOX 1010, manufactured by BASF), 2000 PPM of a benzotriazole based ultraviolet absorbing agent (TINUVIN 328, manufactured by BASF), 2000 PPM of a hindered amine based light stabilizer (CHIMASSORB 944, manufactured by BASF), and 1000 PPM of the aforementioned nucleating agent vesicles were added to a transparent olefin based resin made of 100% by weight of a highly crystalline homopolypropylene resin with a pentad fraction of 97.8%, a melt flow rate (MFR) of 15 g/10 min (230° C.), a molecular weight distribution MWD (Mw/Mn) of 2.3. Then, the resin composition formed by adding the above additives to the transparent olefin-based resin and an adhesive layer 6 made of a polyethylene-based easily adhesive resin were coextruded using a melt extruder so as to obtain a resin sheet comprising a transparent resin layer 7 having a thickness of 80 Further, the resin sheet and the primary film resin sheet 4 having opacity and a thickness of 70 μm were bonded together by extrusion lamination. At this time, the Martens hardness of the transparent resin layer 7 was 60 N/mm$^2$. Next, an embossed pattern 7a was formed on the surface of the transparent resin layer 7 using a mold roll for embossing, and then a two-part curing type urethane top coat (W184, manufactured by DIC Graphics, applied amount 3 g/m$^2$) was applied so as to cover the embossed pattern 7a, thereby forming the top coat layer 8. Thus, the decorative sheet 1 having a total thickness of 155 μm according to Example 2 was obtained.

Example 3

In Example 3, a decorative sheet 1 comprising a transparent resin layer 7 having a Martens hardness of 60 N/mm$^2$ was prepared by adding the above nucleating agent vesicles to a highly crystalline homopolypropylene resin. In the decorative sheet 1 of this example, the primary film layer 4 is omitted.

Specifically, 500 PPM of a hindered amine based antioxidant (IRGANOX 1010, manufactured by BASF), 2000 PPM of a benzotriazole based ultraviolet absorbing agent (TINUVIN 328, manufactured by BASF), 2000 PPM of a hindered amine based light stabilizer (CHIMASSORB 944, manufactured by BASF), and 1000 PPM of the aforementioned nucleating agent vesicles were added to a transparent olefin based resin made of 100% by weight of a highly crystalline homopolypropylene resin with a pentad fraction of 97.8%, a melt flow rate (MFR) of 15 g/10 min (230° C.), a molecular weight distribution MWD (Mw/Mn) of 2.3. Then, it was extruded using a melt extruder to form a transparent resin sheet 7 having a thickness of 80 μm. Next, corona treatment was applied to both surfaces of the transparent resin sheet 7 so that the wetting tension of the surfaces becomes 40 dyn/cm or higher. At this time, the Martens hardness of the transparent resin sheet 7 was 60 N/mm$^2$. Then, on one side of the obtained transparent resin sheet 7, a pattern printing layer 5 was formed by printing a pattern using a two-part curing urethane ink (V180, manufactured by Toyo Ink), and over the pattern printing layer 5, a two-part curing type urethane ink (V180, manufactured by Toyo Ink, applied amount 6 g/m$^2$) was applied to form a concealing layer 3. Further, an embossed pattern 7a was formed on the other side of the transparent resin sheet 7 using a mold roll for embossing, and then a two-part curing type urethane top coat (W184, manufactured by DIC Graphics, applied amount 3 g/m$^2$) was applied so as to cover the embossed pattern 7a, thereby forming the top coat layer 8. Thus, the decorative sheet 1 having a total thickness of 110 μm according to Example 3 was obtained.

Example 4

In Example 4, a decorative sheet 1 comprising a transparent resin layer 7 having a Martens hardness of 45 N/mm$^2$ was prepared by adding the above nucleating agent vesicles to a transparent olefin-based resin comprising 60% by weight of highly crystalline homopolypropylene resin and 40% by weight of random polypropylene resin. The decorative sheet 1 of the present example comprises a primary film resin sheet 4 as the primary film layer 4, and it was formed by bonding the primary film resin sheet 4 and the transparent resin sheet 7 together by extrusion lamination.

Specifically, the basic configuration of this example is the same as that of the decorative sheet 1 of Example 2, except that a transparent resin sheet 7 was used wherein the transparent olefin-based resin comprises 60% by weight of a highly crystalline homopolypropylene resin having a pentad fraction of 97.8%, a melt flow rate (MFR) of 15 g/10 min (230° C.), a molecular weight distribution MWD (Mw/Mn) of 2.3, and 40% by weight of a low-crystallinity random polypropylene resin (J226T, manufactured by Prime Polymer), and various functional additives and 1000 PPM of nucleating agent vesicles are added thereto. At this time, the Martens hardness of the transparent resin layer 7 was 45 N/mm$^2$.

Comparative Example 1

In Comparative Example 1, a decorative sheet 1 comprising a transparent resin layer 7 having a Martens hardness of 50 N/mm$^2$ was prepared by adding, to a highly crystalline homopolypropylene resin, a nucleating agent on which the vesicle formation process has not been carried out. The decorative sheet 1 of the present example comprises a primary film resin sheet 4 as the primary film layer 4, and it was formed by bonding the primary film resin sheet 4 and the transparent resin sheet 7 together by extrusion lamination.

Specifically, the basic configuration of this comparative example is the same as that of the decorative sheet 1 of Example 2, except that a transparent resin sheet 7 was used wherein various functional additives and 1000 PPM of a phosphate ester metal salt based nucleating agent (ADK STAB NA-21, manufactured by ADEKA) as a nucleating agent on which vesicle formation is not performed are added to a transparent olefin-based resin. At this time, the Martens hardness of the transparent resin layer 7 was 50 N/mm$^2$.

Comparative Example 2

In Comparative Example 2, a decorative sheet 1 comprising a transparent resin layer 7 having a Martens hardness of 52 N/mm$^2$ was prepared by adding, to a highly crystalline homopolypropylene resin, a nucleating agent on which a nanoization process has been carried out using a solid phase method. The decorative sheet 1 of the present comparative example comprises a primary film resin sheet 4 as the primary film layer 4, and it was formed by bonding the primary film resin sheet 4 and the transparent resin sheet 7 together by extrusion lamination.

Specifically, the basic configuration of this comparative example is the same as that of the decorative sheet 1 of Example 2, except that a transparent resin sheet 7 was used wherein various functional additives and 1000 PPM of a nucleating agent on which a nanoization process has been performed using a solid phase method are added to a transparent olefin-based resin. The solid phase method here may be a method of mechanically pulverizing particles by a ball mill, a bead mill, a rod mill, a colloid mill, a conical mill, a disc mill, a hammer mill, or a jet mill. In the present comparative example, a mixture of isopropyl alcohol and phosphoric acid ester metal salt based nucleating agent (ADK STAB NA-21, manufactured by ADEKA) was pulverized for 60 minutes with a bead mill using stabilized zirconia beads having a particle size of 30 and the resulting product was used as the solid phase nanoized nucleating agent. At this time, the Martens hardness of the transparent resin layer 7 was 52 N/mm$^2$.

Comparative Example 3

In Example 3, a decorative sheet 1 comprising a transparent resin layer 7 having a Martens hardness of 30 N/mm$^2$ was prepared without adding a nucleating agent to a highly crystalline homopolypropylene resin. The decorative sheet 1 of the present comparative example comprises a primary film resin sheet 4 as the primary film layer 4, and it was formed by bonding the primary film resin sheet 4 and the transparent resin sheet 7 together by extrusion lamination.

Comparative Example 4

In Comparative Example 4, a decorative sheet 1 comprising a transparent resin layer 7 having a Martens hardness of 35 N/mm$^2$ was prepared by adding the above nucleating agent vesicles to a transparent olefin-based resin comprising 40% by weight of highly crystalline homopolypropylene resin and 60% by weight of random polypropylene resin. The decorative sheet 1 of the present comparative example comprises a primary film resin sheet 4 as the primary film layer 4, and it was formed by bonding the primary film resin sheet 4 and the transparent resin sheet 7 together by extrusion lamination.

<Method of Measuring Martens Hardness>

The method of measuring the Martens hardness of the transparent resin layers 7 of Examples 1 to 4 and Comparative Examples 1 to 4 will be described. The measurement was carried out using a Martens hardness measuring device (FISCHERSCOPE HM 2000, manufactured by Fischer Instruments) that complies with ISO14577. The measurement is carried out with respect to a cut surface of the decorative sheet 1 in order to avoid the influence of the laminated resin layers other than the transparent resin layer 7 at the time of measurement. Thus, after surrounding each decorative sheet 1 with resin such as a cold-hardening epoxy resin or UV curing resin and sufficiently curing it, it was cut so that a cut surface of each decorative sheet 1 appears, and then mechanical polishing was performed to obtain the measurement surface of each sample. In these examples and comparative examples, in order to exclude the influence of hardness distribution in the direction parallel to the pressing direction of the indenter (hardness distribution in the depth direction) and the hardness distribution in the direction perpendicular to the pressing direction of the indenter (hardness distribution in the measurement surface direction), the total thickness of the transparent resin layer 7 was set within the range of 20 μm or greater and 200 μm or less. The specific measurement method is to press an indenter into the transparent resin layer 7 at the measurement surface of each sample, and calculate Martens hardness from the indentation depth and the load. The measurement was carried out with a test force of 10 mN, a test force loading required time of 10 seconds, and a test force maintaining time of 5 seconds. The calculated Martens hardness of each sample is as shown in Table 1.

Each of the decorative sheets 1 of Examples 1 to 4 and Comparative Examples 1 to 4 obtained as described above was attached to a wooden substrate B using a urethane based adhesive, and then subjected to a pencil hardness test, a V-groove bending suitability test, and a visual design evaluation test. The detailed evaluation method of each evaluation test will be explained below.

<Pencil Hardness Test>

In the pencil hardness test, using pencils of 2B, B, HB, F, H, 2H, and 3H, the angle of each pencil with respect to the decorative sheet 1 was fixed at 45±1°, and the pencil was slid applying a load of 1 kg to the pencil to determine whether a scratch is formed on the decorative sheet (in compliance with JIS K5400 of former JIS). The test was carried out starting from pencils with lower hardnesses, and the hardness at which a scratch was formed is indicated as the surface hardness of the decorative sheet 1.

<V-Groove Bending Suitability Test>

In the V-groove bending suitability test, on one side of a medium density fiber board (MDF) as the substrate B, each of the decorative sheets 1 of Examples 1 to 4 and Comparative Examples 1 to 4 obtained as described above were attached using a urethane-based adhesive, and a V-shaped groove was formed in the other side of the substrate B so that it reaches the boundary where the substrate B and the decorative sheet 1 are bonded to each other and in such a manner that the opposite side of the decorative sheet 1 is not damaged. Next, the substrate B is bent to 90 degrees along the V-shaped groove so that the apex comes to the surface of the decorative sheet 1. The bent part of the surface of the decorative sheet 1 is observed with an optical microscope to find whitening or cracking, thereby evaluating its post-processing resistance. The evaluation was conducted with the following three stages.

○: No whitening or cracking observed
Δ: Whitening observed
x: Cracking observed

<Design Evaluation Test>

In the design evaluation test, the decorative sheets 1 were visually evaluated by eye. "○" indicates that it suffices the design property required for decorative sheets, and in other cases, the observed abnormalities are described.

Table 1 shows the results of the pencil hardness test, V-groove bending suitability test, and visual design evaluation test.

TABLE 1

|  | Nucleating agent | Martens hardness [N/mm$^2$] | Pencil hardness | V-groove bending | Design evaluation |
|---|---|---|---|---|---|
| Example 1 | Vesicle formation | 60 | 2H | ○ | ○ |
| Example 2 | Vesicle formation | 60 | 2H | ○ | ○ |
| Example 3 | Vesicle formation | 60 | 2H | ○ | ○ |
| Example 4 | Vesicle formation | 45 | H | ○ | ○ |
| Comparative Example 1 | No vesicle formation | 50 | H | x | White turbidity |
| Comparative | Solid phase | 52 | H | Δ | ○ |

TABLE 1-continued

| | Nucleating agent | Martens hardness [N/mm$^2$] | Pencil hardness | V-groove bending | Design evaluation |
|---|---|---|---|---|---|
| Example 2 | nanoization | | | | |
| Comparative Example 3 | — | 30 | 2B | ○ | ○ |
| Comparative Example 4 | Vesicle formation | 35 | 2B | ○ | ○ |

As shown in Table 1, the evaluation test results of the decorative sheets 1 indicate that the decorative sheets 1 of Examples 1 to 4 and Comparative Examples 1 and 2 have Martens hardnesses of 40 N/mm$^2$ or higher, and the pencil hardness test results show that they have good surface hardness. As for the decorative sheets 1 of Comparative Example 3 and Comparative Example 4 with Martens hardnesses smaller than 40 N/mm$^2$, the hardness is lowest, at 2B, which shows that they have poor surface hardness. Regarding the decorative sheet 1 of Comparative Example 3, the reason for the poor surface hardness is considered to be due to the lack of nucleating agent addition. Regarding the decorative sheet 1 of Comparative Example 4, the reason for the poor surface hardness indicated by the lowest hardness 2B is considered to be due to the low content (40% by weight) of the highly crystalline homopolypropylene resin in the transparent olefin-based resin.

In addition, with regard to the decorative sheets 1 of Examples 1 to 4 to which the nucleating agent vesicles were added, no whitening or cracking was observed in the V-groove bending suitability test, indicating that they have good post-processing resistance. The decorative sheets 1 of Comparative Example 1 and Comparative Example 2 in which a nucleating agent that is not nanoized or a solid phase nanoized nucleating agent is used did not have the post-processing resistance required for decorative sheets. This is considered to be because the use of a nucleating agent that is not nanoized or a solid phase nanoized nucleating agent caused the nucleating agent to agglomerate in the highly crystalline polypropylene resin, resulting in the mechanical strength of that part to reduce. The decorative sheets 1 of Comparative Example 3 to which a nucleating agent was not added and the decorative sheet 1 of Comparative Example 4 to which nucleating agent vesicles were added had the post-processing resistance required for decorative sheets.

As to the design property, white turbidity was observed in the decorative sheet 1 of Comparative Example 1 to which a nucleating agent that has not been subjected to vesicle formation was added.

According to the above evaluation results, it was found that, as with the decorative sheets 1 of Examples 1 to 4 of the present invention, those comprising a transparent resin layer 7 formed by adding to a transparent olefin-based resin nucleating agent vesicles and having a Martens hardness of 40 N/mm$^2$ or higher provide decorative sheets 1 having good scratch resistance, good post-processing resistance, and high transparency.

Further, decorative sheets 1 comprising a transparent resin layer 7 in which a transparent olefin-based resin comprises 50% by weight or more and 100% by weight or less, in particular 60% by weight or more of a highly crystalline homopolypropylene resin provide decorative sheets 1 that have particularly good scratch resistance.

Examples of the decorative sheet 1 of the present invention are not limited to the above-described embodiments and examples, and various modifications may be made within a range not departing from the spirit of the present invention.

Reference Examples

Decorative sheets other than the decorative sheets described in the embodiment of the present invention will be briefly described as reference examples of the present invention.

In recent years, as shown in PTLs 1 to 5 described above, a number of decorative sheets in which olefin-based resin is used have been proposed as alternative decorative sheets to polyvinyl chloride decorative sheets.

Since these decorative sheets do not use vinyl chloride resin, the generation of toxic gases and the like at the time of incineration is suppressed. However, since these decorative sheets use a polypropylene sheet or a soft polypropylene sheet made of a general olefin-based resin, the surface scratch resistance is poor and far inferior to the scratch resistance of the conventional polyvinyl chloride decorative sheets.

Thus, in order to solve these drawbacks, the inventors of the present invention proposed a decorative sheet that has good scratch resistance and post-processing resistance of the surface described in PTL 6 described above. However, along with the increase in the use of decorative boards using such decorative sheets, consumers are paying more attention to their quality.

In general, a crystalline resin such as an olefin-based resin can change its mechanical properties by controlling the degree of crystallinity, which is the ratio of the crystalline components to the amorphous components in the resin. Factors for controlling the degree of crystallinity include material factors such as the molecular structure of the resin itself and the addition of a nucleating agent, and process factors such as molding processing conditions for processing the crystalline resin. In the present invention, the inventors invented a decorative sheet having good scratch resistance and post-processing resistance by controlling both of the material factors and process factors so that the mechanical strength of the transparent resin layer made of an olefin-based resin is improved.

In addition, since the spherulite size in the crystal part of polypropylene resins is usually larger than visible light wavelengths (400 to 750 nm), scattering of light is increased and a milky white color is exhibited. On the other hand, transparent resin layers expected to be substituted by polypropylene resin need to have high transparency from design aspects so that patterns or designs formed on a lower layer thereof can be clearly seen through the transparent resin layer.

Regarding the control of the degree of crystallinity described above, when crystal growth was carried out solely by controlling the molding processing conditions, the transparency may be impaired due to excessive growth of the spherulite size. Thus, attempts have been made to improve the transparency of the polypropylene resin by adding a nucleating agent. However, as described in PTL 6 mentioned above, when the size of the spherulites becomes 1 μm or less, cracks and voids tend to appear due to interfacial destruction between spherulites and brittle fracture of spherulites upon bending, for example, V-groove bending. Therefore, it was difficult to simultaneously achieve high transparency, and surface scratch resistance and good post-processability.

REFERENCE SIGNS LIST

1 . . . Decorative sheet; 2 . . . Primer layer; 3 . . . Concealing layer; 4 . . . Primary film layer (primary film resin sheet); 5 . . . Pattern printing layer; 6 . . . Adhesive layer; 7 . . . Transparent resin layer (transparent resin sheet); 7a . . . Embossed pattern; 8 . . . Top coat layer

What is claimed is:

1. A decorative sheet comprising:
   a transparent resin layer formed by adding, to a transparent olefin-based resin, nucleating agent vesicles that are vesicles having a monolayer outer membrane and containing a nucleating agent, and,
   wherein the transparent resin layer has a Martens hardness of 40 N/mm$^2$ or higher.

2. The decorative sheet of claim 1, wherein 50% by weight or more and 100% by weight or less of the transparent olefin-based resin is composed of a highly crystalline homopolypropylene resin having an isotactic pentad fraction (mmmm fraction) of 95% or higher.

3. The decorative sheet of claim 2, wherein the transparent olefin-based resin is composed of 100% by weight of the highly crystalline homopolypropylene resin.

4. A method of manufacturing the decorative sheet of claim 1, comprising:
   encapsulating the nucleating agent in the vesicle by a supercritical reverse phase evaporation method.

5. A decorative sheet comprising:
   a primer layer, a concealing layer, a primary layer, a pattern printing layer, an adhesive layer, a transparent resin layer and a top coat layer laminated in this order on a side of a substrate to which the decorative sheet is attached,
   wherein the transparent resin layer is formed by adding, to a transparent olefin-based resin, nucleating agent vesicles that are vesicles having a monolayer outer membrane and containing a nucleating agent, and,
   wherein the transparent resin layer has a Martens hardness of 40 N/mm$^2$ or higher.

6. The decorative sheet of claim 5, wherein 50% by weight or more and 100% by weight or less of the transparent olefin-based resin is composed of a highly crystalline homopolypropylene resin having an isotactic pentad fraction (mmmm fraction) of 95% or higher.

7. The decorative sheet of claim 6, wherein the transparent olefin-based resin is composed of 100% by weight of the highly crystalline homopolypropylene resin.

8. A method of manufacturing the decorative sheet of claim 5, comprising:
   encapsulating the nucleating agent in the vesicle by a supercritical reverse phase evaporation method.

9. The decorative sheet of claim 5, wherein the primer layer is 0.1 to 20 μm thick, the concealing layer is 2 μm to 20 μm thick, the primary film layer is 30 μm to 250 μm thick, the pattern printing layer is 3 μm to 20 μm thick, the adhesive layer is 1 μm to 20 μm thick, the transparent resin layer is 20 μm to 200 μm thick, the top coat layer is 3 μm to 20 μm thick, and a total thickness of the decorative sheet is 59 μm to 550 μm.

* * * * *